United States Patent
Pottebaum et al.

(10) Patent No.: US 9,887,648 B2
(45) Date of Patent: Feb. 6, 2018

(54) MOTOR SPEED CONTROL WITH SPEED FOLDBACK FOR PHASE IMBALANCE PROTECTION

(71) Applicant: Yaskawa America, Inc., Waukegan, IL (US)

(72) Inventors: Joseph Raymond Pottebaum, Brookfield, WI (US); John Alan Cairo, Kenosha, WI (US); Brian W. Geoffrey, New Berlin, WI (US); William C. Phillips, Evanston, IL (US)

(73) Assignee: Yaskawa America, Inc., Waukegan, IL (US)

( * ) Notice: Subject to any disclaimer, the term of this patent is extended or adjusted under 35 U.S.C. 154(b) by 539 days.

(21) Appl. No.: 14/068,579

(22) Filed: Oct. 31, 2013

(65) Prior Publication Data

US 2015/0115854 A1   Apr. 30, 2015

(51) Int. Cl.
| | |
|---|---|
| G05B 5/00 | (2006.01) |
| H02H 7/08 | (2006.01) |
| H02P 1/00 | (2006.01) |
| H02P 3/00 | (2006.01) |
| H02P 7/00 | (2016.01) |
| H02P 6/10 | (2006.01) |
| H02M 5/458 | (2006.01) |
| H02H 7/085 | (2006.01) |
| H02M 1/14 | (2006.01) |
| H02M 1/00 | (2006.01) |

(52) U.S. Cl.
CPC ............. *H02P 6/10* (2013.01); *H02M 5/458* (2013.01); *H02H 7/0851* (2013.01); *H02M 1/14* (2013.01); *H02M 2001/0025* (2013.01)

(58) Field of Classification Search
CPC ............... H02H 7/0851; E05Y 2900/55; E05F 15/1607; E05F 15/1684
USPC .......................................................... 318/445
See application file for complete search history.

(56) References Cited

U.S. PATENT DOCUMENTS

| | | | | |
|---|---|---|---|---|
| 6,229,278 B1 * | 5/2001 | Garces | .............. | H02M 7/53875 318/801 |
| 7,330,779 B2 * | 2/2008 | Schulz | ................ | E21B 41/0021 417/44.11 |
| 7,437,215 B2 * | 10/2008 | Anderson | ........... | E21B 41/0021 417/44.11 |
| 7,534,096 B2 * | 5/2009 | Schulz | ................ | E21B 41/0021 417/44.11 |

(Continued)

*Primary Examiner* — Shawki S Ismail
*Assistant Examiner* — Bradley Brown
(74) *Attorney, Agent, or Firm* — Wood, Phillips, Katz, Clark & Mortimer

(57) ABSTRACT

A variable frequency motor drive comprises a converter including a rectifier having an input for connection to an AC power source and converting the AC power to DC power. A DC bus is connected to the rectifier circuit. At least one bus capacitor is across the DC bus. An inverter receives DC power from the DC bus and converts the DC power to AC power to drive a motor. A controller is operatively connected to the converter. The controller comprises a speed control controlling the inverter responsive to a speed command to maintain a desired motor speed. A speed foldback control measures DC bus ripple voltage and regulates the speed command responsive to the measured DC bus ripple voltage.

5 Claims, 3 Drawing Sheets

(56) References Cited

U.S. PATENT DOCUMENTS

| | | | |
|---|---|---|---|
| 8,421,397 B2* | 4/2013 | Yu | H02P 1/28 |
| | | | 318/778 |
| 2003/0098668 A1* | 5/2003 | Jadric | H02M 5/458 |
| | | | 318/801 |
| 2008/0165456 A1* | 7/2008 | Ganev et al. | 361/23 |
| 2012/0242273 A1* | 9/2012 | Hsieh | H02P 1/029 |
| | | | 318/806 |
| 2014/0210391 A1* | 7/2014 | Bozic et al. | 318/400.11 |
| 2014/0254217 A1* | 9/2014 | Li et al. | 363/37 |

* cited by examiner

MOTOR SPEED CONTROL WITH SPEED FOLDBACK FOR PHASE IMBALANCE PROTECTION

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to a motor speed control and more particularly, to the use of a speed foldback control for phase imbalance protection.

BACKGROUND

Motor drive systems using speed controls of the basic design illustrated in FIG. 1 are in common usage and are successfully applied in many applications. This type of motor drive system uses an AC/DC converter connected via a DC bus to a DC/AC converter. The DC bus includes a DC bus filter capacitor. The system is controlled by a speed control circuit. Even though this configuration has proven reliable and durable, it suffers from the ripple current limitation of the DC bus filter capacitors. In the very act of performing its purpose as a filter, the capacitors conduct the AC portion of the rectified bus current directly across the converter. The ripple current flowing through the DC bus filter capacitors' internal resistance creates heat and raises the internal temperature of the capacitors reducing their life expectancy. Excessive ripple current can cause premature and catastrophic failure of the capacitors.

The main factors affecting the amount of DC bus capacitor ripple voltage are: whether the incoming AC power is single-phase or multi-phase, the voltage and phase balance in a multi-phase system, the incoming AC voltage, frequency and waveform, the actual power delivered by the motor speed control to the load, the amount of impedance (inductance primarily) in the AC lines supplying the motor speed control, and any bus inductance between the rectifier and the bus capacitors.

Of the factors listed above, the only one controllable by the motor speed control is the power delivered to the motor and the load. Since power is speed multiplied by torque, the motor speed control can adjust load power by either adjusting speed or torque.

Most commonly, but not exclusively, a motor drive system will incorporate a diode bridge rectifier consisting of six diodes in a well-known bridge configuration intended to be powered from a three-phase AC electrical source and producing a continuous DC voltage output. Some ripple voltage is also produced as a by-product of the rectification process.

Ideally, the motor drive system's converter section is supplied with balanced symmetrical sinusoidal line-to-line voltages. For practical reasons the converter section and DC bus filter section (including the DC bus filter capacitors) are designed to accommodate a certain amount of imbalance in the voltages and asymmetry in the phases and distortion of the sinusoidal waveform. Nevertheless, any imbalance or asymmetry in the AC input voltages will increase the ripple voltage on the DC bus and so increase the ripple current through the DC bus filter capacitors. This increases their temperature and decreases their lifetime. The extreme limit of imbalance and asymmetry is single-phase operation.

A motor drive system may include a converter section and DC bus filter section designed to be powered from a single-phase AC power supply. However, most integral horsepower motor drive systems in commercial and industrial use are designed to be powered from a three-phase supply. Many of these with suitable de-rating may be operated from a single-phase power supply. A motor drive system designed to be powered from a three-phase AC power supply can generally only provide less than half its rated power when supplied from a single-phase power supply without severely stressing its converter section and DC bus components. The de-rating factor is chosen primarily to keep the ripple on the DC bus capacitors within acceptable limits.

Most motor drive systems designed to be powered from a three-phase AC supply have some means of detecting unacceptable line imbalance and phase-loss. This can be done by directly monitoring the three-phase AC input, or by observing the ripple on the DC bus either before or after any filter reactor. Motor drive systems respond to the detected line imbalance or phase loss by shutting down if the imbalance persists for longer than a preset time.

Many three-phase motor drive systems can be de-rated for single-phase operation. The de-rating factor is usually enforced by reducing the output current capacity of the motor drive system so that only motors of acceptable power rating can be operated from the motor drive system. Even though the stress on the DC bus is primarily a function of output power and input voltage, this approach has merit because motor current and power are related. However, this approach precludes the use of reduced voltage motors whose power output is within the capacity of the motor drive system, but whose current is higher than the de-rated rating.

The present invention is directed to improvements in phase imbalance protection in motor drive systems.

SUMMARY

As disclosed herein, a motor speed control uses speed foldback for phase imbalance protection.

In accordance with one aspect of the invention there is disclosed a variable frequency motor drive system comprising a converter including a rectifier having an input for connection to an AC power source and converting the AC power to DC power. A DC bus is connected to the rectifier circuit. At least one bus capacitor is across the DC bus. An inverter receives DC power from the DC bus and converts the DC power to AC power to drive a motor. A controller is operatively connected to the converter. The controller comprises a speed control controlling the inverter responsive to a speed command to maintain a desired motor speed. A speed foldback control measures DC bus ripple voltage and regulates the speed command responsive to the measured DC bus ripple voltage.

It is a feature that the controller comprises a slew rate filter for filtering the measured DC bus ripple voltage.

It is another feature that the speed foldback control clamps the speed command if measured DC bus ripple voltage exceeds a ripple voltage set point value. The speed foldback control may determine a difference between the ripple voltage set point and the DC bus ripple voltage to determine a maximum speed command value. The speed foldback control may decrease the maximum speed command value at a rate proportional to the difference between the ripple voltage set point and the DC bus ripple voltage. The speed foldback control may comprise a proportional-integral control loop to determine the maximum speed command value.

It is another feature that if the measured DC bus ripple voltage is within an acceptable range, then the speed foldback control does not reduce the motor speed command.

There is disclosed in accordance with another aspect of the invention a motor drive system comprising a diode rectifier receiving AC power from a source and converting the AC power to DC power. An inverter receives DC power and converts the DC power to AC power to drive a load. A DC bus is connected between the diode rectifier and the inverter to provide a relatively fixed DC voltage for the inverter. At least one bus capacitor is across the bus. A controller is operatively connected to the inverter. The controller comprises a speed control controlling the inverter responsive to a speed command to maintain a desired motor speed. A speed foldback control measures DC bus ripple voltage and regulates the speed command responsive to the measured DC bus ripple voltage.

There is disclosed in accordance with another aspect of the invention a motor drive system comprising a diode rectifier receiving AC power from a source and converting the AC power to DC power. An inverter receives DC power and converts the DC power to AC power to drive a load. A DC bus is connected between the diode rectifier and the inverter to provide a relatively fixed DC voltage for the inverter. At least one bus capacitor is across the bus. A controller is operatively connected to the inverter. The controller comprises a speed control controlling the inverter responsive to a speed command to maintain a desired motor speed. A speed foldback control measures DC bus ripple voltage and limits the speed command responsive to the measured DC bus ripple voltage.

More particularly, a motor controller measures and controls the ripple voltage on DC bus capacitors by reducing output frequency and as a consequence motor speed in a controlled manner as the ripple voltage exceeds a predefined sustainable level and by regulating the ripple voltage at that level despite changes in input voltage magnitude, phase and voltage balance, and load.

The motor controller may be used to control not only the speed of a motor, but also its torque, power, angular position, or any suitable combination of these.

Other features and advantages will be apparent from a review of the entire specification, including the appended claims and drawings.

DETAILED DESCRIPTION

Figure 1:
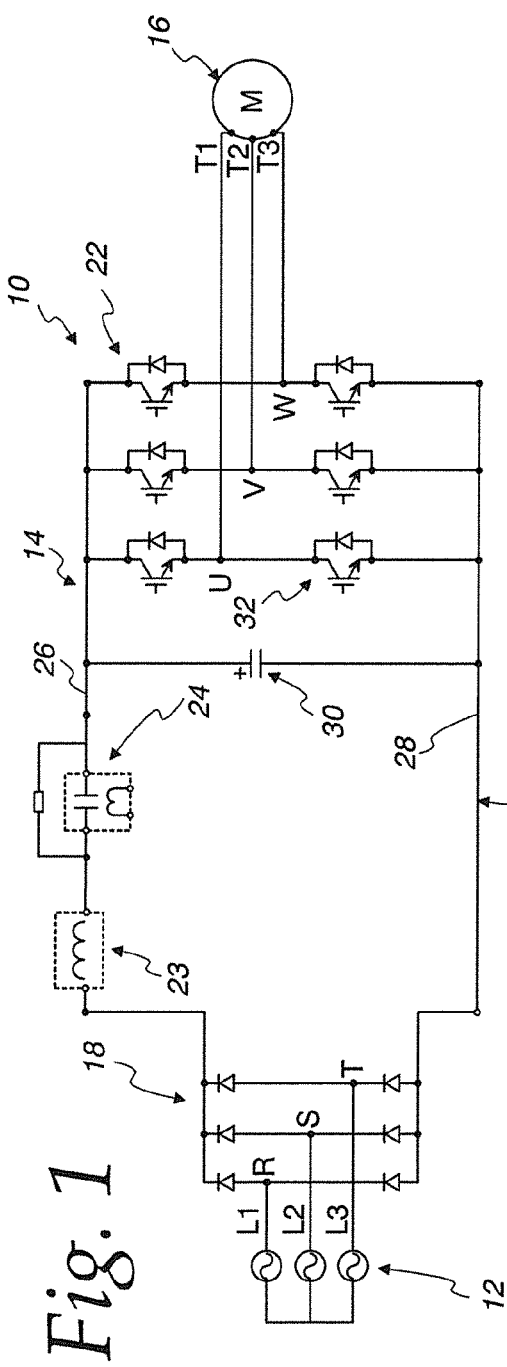
FIG. 1 is a schematic of a variable frequency motor drive.

Referring initially to FIG. 1, a motor drive system 10 is illustrated. The motor drive system 10 includes an AC source 12 powering a variable frequency drive (VFD) 14 for driving a motor 16. In the illustrated embodiment, the AC source 12 provides three-phase AC power on feeder conductors labeled L1, L2 and L3 connected to respective terminals R, S and T of the VFD 14. The AC source could alternatively be a single-phase source, as is known. The VFD 14, as described more particularly below, converts the AC power from the terminals R, S and T to DC power and converts it back to AC power at a select frequency which is then impressed across terminals U, V and W connected to motor terminals T1, T2 and T3, respectively.

The VFD 14 includes an AC/DC converter 18 connected by a DC bus 20 to a DC/AC converter 22. Particularly, according to the illustrated embodiment of the invention, the AC/DC converter 18 comprises a full wave bridge rectifier circuit of conventional construction which is operable to convert three-phase AC power to DC power. The DC bus 20 optionally includes a DC link choke 23. The DC link choke 23 reduces harmonics and ripple components. The DC bus 20 further includes a soft-charge circuit 24. The DC bus 20 includes rails 26 and 28. A DC bus capacitor 30 is connected between the rails 26 and 28. As is known, there may be more than one DC bus capacitor. The DC/AC converter 22 comprises an inverter. Particularly, the inverter 22 comprises a pulse width modulation (PWM) inverter using insulated gate bipolar transistors (IGBTs) 32. The six IGBTs 32 are connected in a three phase bridge configuration to the DC bus 20 to develop power at the terminals U, V and W. The IGBTs 32 are pulse width modulated using a controller 34, see FIG. 3, discussed below. Particularly, the PWM inverter 22 is controlled to create a sinusoidal effect for the motor 16. The pulse frequency used is fixed. The pulse width is varied to vary sinusoidal frequency.

It is well known that elevated temperature will shorten the life of the motor drive systems DC bus capacitor(s) 30. The heat causing this elevated temperature may be caused by ripple current flowing through the capacitor(s) 30. As described herein, the life of the capacitors and therefore the life of the motor drive system 10 can be extended by maintaining the capacitor ripple current within acceptable limits.

There is a relationship between the ripple current through a capacitor and the ripple voltage across it. This relationship is that the instantaneous ripple current equals the capacitance times the rate of change of the voltage with respect to time. The root-mean-square (rms) value of the ripple current, which is a measure of its ability to create heat, depends on the magnitude of the ripple voltage as well as its frequency and waveform.

The disclosed VFD 14 uses a controller 34 that limits DC bus capacitor ripple current, and thus temperature rise, by monitoring and controlling ripple voltage. This controller 34 controls capacitor ripple voltage by reducing the motor speed as the ripple voltage exceeds a preset level determined to be acceptable for the particular motor speed control model. The process is referred to as 'speed foldback'.

More particularly, the controller 34 measures and controls the DC bus capacitor ripple voltage by reducing its output frequency and as a consequence motor speed in a controlled manner as the ripple voltage exceeds a predefined sustainable level and regulates the ripple voltage at that level or less despite changes in input voltage magnitude, phase and voltage balance, and load.

Figure 2:
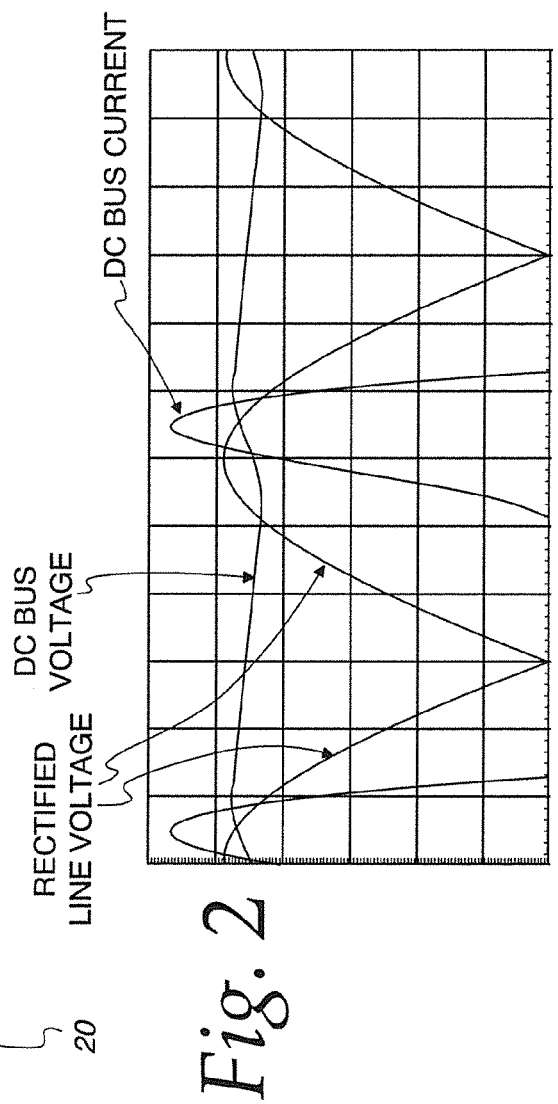
FIG. 2 is a curve illustrating DC bus voltage and current relative to a rectified line voltage.

FIG. 2 illustrates the voltage and current relationships in the motor drive system 10. The rectified line voltage is the line voltage from the bridge rectifier 18. This voltage is filtered by the soft-charge circuit 24 and the DC bus capacitor 30 to provide a DC bus voltage and current, as generally illustrated.

Figure 3:
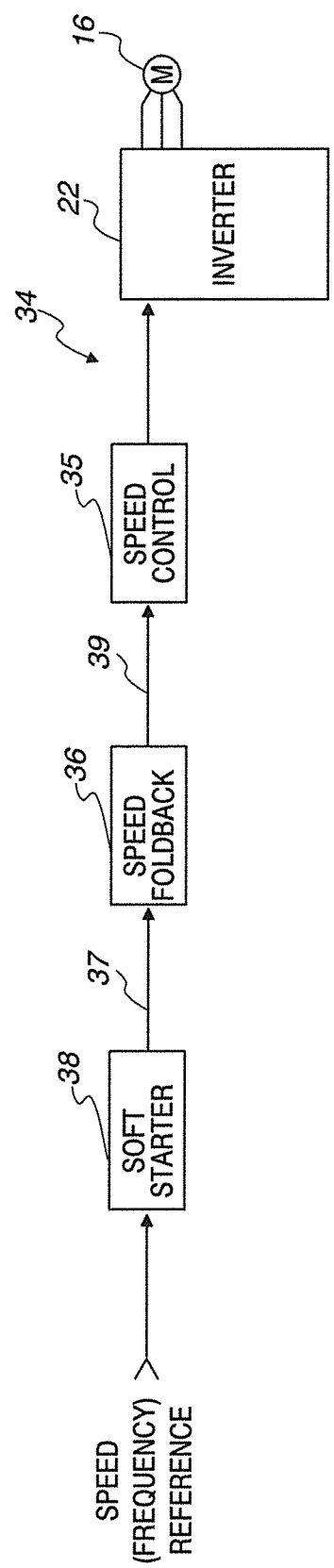
FIG. 3 is a block diagram of a controller for the drive of FIG. 1.

FIG. 3 illustrates a block diagram for the controller 34 which includes a speed control 35 for the inverter 22. The speed control 35 comprises a conventional type speed control circuit which controls output frequency and as a consequence motor speed in a controlled manner. In accordance with the invention, a speed foldback control 36, discussed below, regulates and/or limits a frequency command to the speed control 35 to control DC bus capacitor ripple voltage.

As will be apparent, the speed control 35 can be of numerous different designs. Thus, not all of the details and features of the speed control 35 will be illustrated or discussed herein except as relates particularly to the features of the motor speed control with speed foldback for phase imbalance protection.

The controller 34 may include a soft starter 38. The soft starter 38 receives a frequency reference representing a desired motor speed and develops a frequency command on a line 37. At startup, the soft starter 38 ramps up the frequency command. The frequency command is passed through the speed foldback control 36 and is provided to the speed control 35 on a line 39. The speed control 35 contains control elements that convert the frequency command to a voltage command and performs compensations according to load conditions. The compensated voltage command from the speed control 35 is then provided to the inverter 22. The details of this process within the speed control 35 are well known and thus are not further described herein. The voltage command is used in a conventional manner to pulse width modulate the six IGBTs 32, see FIG. 1, of the inverter 22 to develop the desired output frequency to control motor speed.

Figure 4:
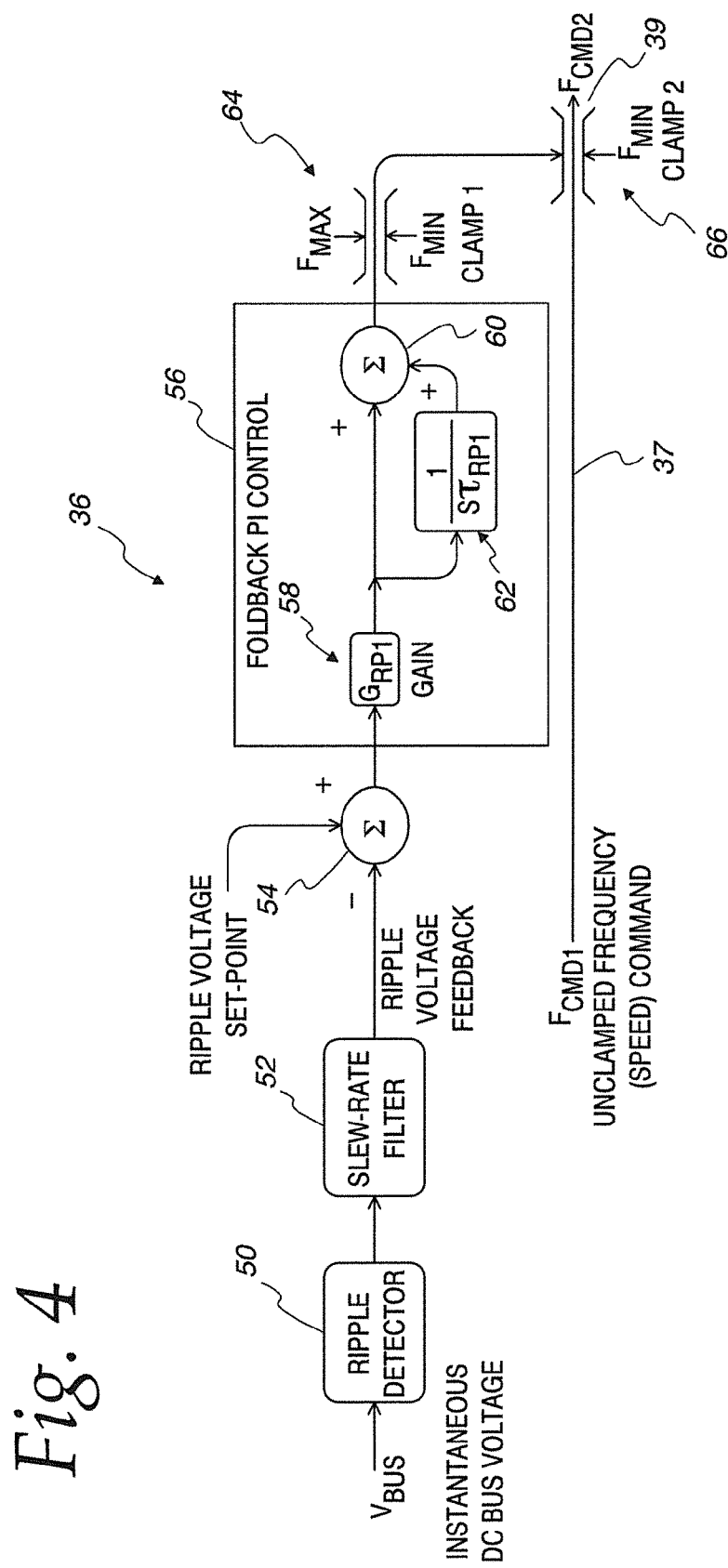
FIG. 4 is a block diagram of a speed foldback loop for the controller of FIG. 3.

The speed foldback control 36 is illustrated in detail in FIG. 4. A ripple detector 50 senses instantaneous DC bus voltage, representing the voltage across the rails 26 and 28. The instantaneous DC bus voltage is a numerical value of the motor drive systems DC bus voltage, see FIG. 2, as measured by an ND converter (not shown). The ripple detector 50 extracts the relative highest and lowest value over a time interval, subtracts the lowest from the highest value and designates the difference as the peak-to-peak ripple voltage. The peak-to-peak ripple voltage is supplied to a slew rate filter 52 which develops a ripple voltage feedback value. The slew rate filter 52 prevents large transient changes in bus voltage from causing a reduction or foldback in speed by limiting the magnitude change per unit time of the ripple voltage feedback. The ripple voltage feedback is an input to a first adder 54. Another input to the first adder 54 comprises a ripple voltage set-point. The ripple voltage set-point is a numerical value representing the maximum allowable peak-to-peak ripple voltage. The ripple voltage set-point is determined for each individual model type based on the model's ability to withstand capacitor ripple.

The output of the first adder 54 is the difference between the ripple voltage set-point and the ripple voltage feedback. This difference value is input to a foldback proportional-integral (PI) control 56. The foldback PI control 56 includes a gain block 58 receiving the output of the first adder 54. The output of the gain block 58 is an input to a second adder 60 and to an integrator 62. The output of the integrator is also an input to the second adder 60. The output of the foldback PI control 56 is fed through a first clamp 64, the output of which limits a second clamp 66. The second clamp 66 clamps the unclamped frequency (speed) command $F_{Cmd1}$ output from the soft starter 38, see FIG. 3, on the line 37. $F_{Cmd2}$ is the output from the second clamp 66 and is fed on the line 39 to the speed control 35, see FIG. 3.

$F_{Max}$ and $F_{Min}$ are the programmed maximum and minimum allowable motor frequencies or speeds determined by the application considerations. In the absence of the speed foldback control 36, these values would clamp the frequency command. In the illustrated embodiment of the invention, $F_{Max}$ is the upper limit of the first clamp 64. $F_{Min}$ is the lower limit of both clamps 64 and 66 and is often near zero. The clamped output from the foldback PI control 56 is the upper limit of the second clamp 66.

As long as the controller 34 is running within acceptable limits of DC bus voltage ripple, the upper limit of the second clamp 66 is at the upper limit of the first clamp 64, which is $F_{Max}$. As such, the speed foldback control 36 does nothing to reduce the motor speed. As long as the ripple voltage feedback at the output of the slew rate filter 52 is less than the ripple voltage set-point, the output of the foldback PI control 56 is driven against the upper limit of the first clamp 64, $F_{Max}$. The output of the first clamp 64 is the upper limit of the second clamp 66. As a result, the clamped speed command $F_{Cmd2}$ is allowed the full range of the motor speed control from $F_{Min}$ to $F_{Max}$. The clamped speed command $F_{Cmd2}$ will be equal to the larger of the unclamped speed command $F_{Cmd1}$ or $F_{Min}$. The integrator 62 is initialized to the maximum speed $F_{Max}$, to allow full speed range at start up.

If sustained line imbalance or single-phase operation causes the DC bus ripple voltage feedback to increase above the ripple voltage set-point, then the output of the first adder 54, which is the input of the foldback PI control 56, becomes negative. In the conventional manner of PI control the output of the foldback PI control 56 at the second adder 60 begins to decrease at a rate proportional to the difference between the ripple voltage feedback and the ripple voltage set-point. The decrease ceases when either the DC bus voltage ripple is reduced to an acceptable level or $F_{Min}$ is reached. Since the clamped output of the foldback PI control 56 is the upper limit of the second clamp 66, it effectively limits the maximum value of the Clamped Frequency (Speed) Command $F_{Cmd2}$ and ultimately the motor speed. Reducing the motor speed reduces the power consumed by the motor reducing the power provided by the controller 34 and consequently the DC bus capacitor ripple.

If the forces that caused the DC bus ripple voltage to rise above its acceptable level are mitigated and the ripple voltage feedback falls below the ripple voltage set-point, then the foldback PI control 56 output will begin to rise toward $F_{Max}$ allowing the full range of speed command.

Thus, the speed foldback control 36 is operable to measure and control the ripple voltage on DC bus capacitors by limiting output frequency and as a consequence motor speed in a controlled manner as the ripple voltage exceeds a predefined sustainable level and by regulating the ripple voltage at that level despite changes in input voltage magnitude, phase and voltage balance, and load.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A motor drive system comprising:
a diode rectifier receiving AC power from a source and converting the AC power to DC power;
an inverter for receiving DC power and converting the DC power to AC power to drive a load;
a DC bus connected between the diode rectifier and the inverter to provide a relatively fixed DC voltage for the inverter;
at least one bus capacitor across the bus; and
a controller operatively connected to the inverter, the controller comprising a speed control loop controlling the inverter responsive to a speed command to maintain a desired motor speed, and a speed foldback loop measuring DC bus ripple voltage and limiting the speed command responsive to the measured DC bus ripple voltage, wherein the controller clamps the speed command between select maximum and minimum speed command values and wherein the minimum speed command value comprises a minimum clamp value for the speed control loop, the maximum speed command value comprises a maximum clamp value for the speed foldback loop, and an output of the speed foldback loop comprises a maximum clamp value for the speed control loop.

2. The motor drive system of claim 1 wherein the speed foldback control varies the maximum clamp value for the speed control loop if measured DC bus ripple voltage exceeds a ripple voltage setpoint value.

3. The motor drive system of claim 1 wherein the speed foldback control determines a difference between the ripple voltage setpoint and the DC bus ripple voltage and decreases a maximum speed command value at a rate proportional to the difference between the ripple voltage setpoint and the DC bus ripple voltage to limit the speed command.

4. The motor drive system of claim 3, wherein the speed foldback control comprises a proportional-integral control loop.

5. The motor drive system of claim 1 wherein the controller comprises a slew rate filter for filtering the measured DC bus ripple voltage.

* * * * *